US012460813B2

(12) United States Patent
Halstead

(10) Patent No.: US 12,460,813 B2
(45) Date of Patent: Nov. 4, 2025

(54) COMBINATION CANDLE HOLDER VASE

(71) Applicant: Simone Halstead, Sheridan, WY (US)

(72) Inventor: Simone Halstead, Sheridan, WY (US)

( * ) Notice: Subject to any disclaimer, the term of this patent is extended or adjusted under 35 U.S.C. 154(b) by 937 days.

(21) Appl. No.: 17/670,464

(22) Filed: Feb. 13, 2022

(65) Prior Publication Data

US 2022/0260248 A1 Aug. 18, 2022

Related U.S. Application Data

(60) Provisional application No. 63/149,283, filed on Feb. 14, 2021.

(51) Int. Cl.

| | |
|---|---|
| ***F21V 35/00*** | (2006.01) |
| ***A47F 7/00*** | (2006.01) |
| ***A47G 7/06*** | (2006.01) |
| ***F21S 13/12*** | (2006.01) |
| *B29L 31/00* | (2006.01) |

(52) U.S. Cl.

CPC .......... *F21V 35/003* (2013.01); *A47F 7/0078* (2013.01); *A47G 7/06* (2013.01); *F21S 13/12* (2013.01); *B29L 2031/7136* (2013.01); *Y10T 428/13* (2015.01)

(58) Field of Classification Search

CPC .. F16B 2043/008; F16L 23/162; B65D 5/009; B65D 5/5061; B65D 21/0209; B65D 21/0224; B65D 85/505; F21V 35/003

See application file for complete search history.

(56) References Cited

U.S. PATENT DOCUMENTS

| | | | | |
|---|---|---|---|---|
| 197,931 A * | 12/1877 | Haight | A47B 11/00 | 108/94 |
| 1,401,057 A * | 12/1921 | Elliott | A47B 87/0223 | 211/188 |
| 1,906,190 A * | 4/1933 | Tautz | B24D 9/02 | 451/507 |
| 2,902,174 A * | 9/1959 | Audsley | A47G 23/08 | D7/610 |
| 3,169,496 A * | 2/1965 | Muggli | A47G 23/08 | D7/610 |
| 3,501,617 A * | 3/1970 | Vedder | C23C 14/26 | 118/726 |
| 3,674,612 A * | 7/1972 | Gehl, Jr. | A47G 33/06 | 428/7 |
| 3,951,079 A * | 4/1976 | Tolleson | A47F 5/02 | 108/94 |
| 5,772,050 A * | 6/1998 | Shih | B41K 1/58 | 211/205 |

(Continued)

*Primary Examiner* — Jorge A Pereiro

(74) *Attorney, Agent, or Firm* — David J. Connaughton, Jr.; Justin P. Tinger; Yafei Xue

(57) ABSTRACT

A holder having a first tube having a first end and a second end. A first disk defining a first disk aperture. The first disk including a first surface and a second surface. The second surface positioned over the first end of the first tube. The first disk defining an aperture having a first disk diameter. A second disk including a first surface and a second surface, the first surface of the second disk covering the second end of the first tube. A second tube including a first end and a second end, the second surface of the second disk positioned over the first end of the second tube. A third disk positioned over the second end of the second tube, the third disk defining an aperture having a third disk diameter.

4 Claims, 4 Drawing Sheets

(56) References Cited

U.S. PATENT DOCUMENTS

| | | | | | |
|---|---|---|---|---|---|
| 5,774,918 | A * | 7/1998 | Cassell | B65D 21/083 | 7/111 |
| 7,017,743 | B1 * | 3/2006 | Patterson | B65D 85/04 | 206/419 |
| 7,144,610 | B1 * | 12/2006 | Estes | A47F 5/04 | 428/17 |
| 7,975,643 | B1 * | 7/2011 | Johnson | A47G 19/30 | 211/163 |
| D668,002 | S * | 9/2012 | Mulligan | D11/118 | |
| D668,006 | S * | 9/2012 | Mulligan | D11/118 | |
| 8,276,524 | B2 * | 10/2012 | Goode | A47G 19/00 | 108/94 |
| 8,695,533 | B1 * | 4/2014 | Mulligan | A01K 1/035 | 119/28.5 |
| 8,813,661 | B2 * | 8/2014 | Fakahany | A47B 87/0246 | 108/92 |
| 10,213,041 | B1 * | 2/2019 | Fonseca | F21V 23/002 | |
| 10,813,475 | B2 * | 10/2020 | Stephens | A47F 7/0071 | |
| 2009/0049743 | A1 * | 2/2009 | Lewis, Jr. | A47G 7/06 | 47/41.01 |
| 2011/0204048 | A1 * | 8/2011 | Carino | B65D 21/083 | 220/4.03 |
| 2011/0290805 | A1 * | 12/2011 | Rances | B65D 81/3205 | 220/529 |
| 2013/0136829 | A1 * | 5/2013 | Kandel | A47G 19/00 | 426/132 |

* cited by examiner

COMBINATION CANDLE HOLDER VASE

PRIORITY CLAIM

This non-provisional patent application claims the benefit of U.S. Provisional Application No. 63/149,283 filed on Feb. 14, 2021, the entirety of which is incorporated herein by reference.

FIELD

The present disclosure relates generally to a candle holder. More particularly, the present disclosure relates to an apparatus for receiving an ignitable light sources, such as a candle. The candle holder may be inverted or turned up-side-down and then act as a vase for holding one or more flowers.

BACKGROUND

Candles are used for example in churches and other religious buildings, celebrations, houses, restaurants, hotels, bars, other catering establishments and health spas. Generally the candles are placed in candle holders before and during use wherein the candle holder holds the candle before the candle is lit and whilst the candle is burning.

SUMMARY

According to an exemplary arrangement, a holder, comprises a first tube having a first end and a second end and a first disk defining a first disk aperture. The first disk comprising a first surface and a second surface, the second surface positioned over the first end of the first tube. The first disk defining an aperture having a first disk diameter. A second disk comprising a first surface and a second surface, the first surface of the second disk covering the second end of the first tube. A second tube comprising a first end and a second end, the second surface of the second disk positioned over the first end of the second tube. A third disk positioned over the second end of the second tube, the third disk defining an aperture having a third disk diameter.

In an arrangement, the second surface of the first disk comprises a circular recess wherein the first end of the first tube is positioned within the circular recess of the second surface of the first disk. The circular recess of the second surface of the first disk defines a circular recess diameter, and the circular recess diameter is substantially equivalent to a first tube diameter of the first tube.

In an arrangement, the first surface of the second disk comprises a circular recess wherein the second end of the first tube is positioned within the circular recess of the first surface of the second disk. The circular recess of the first surface of the second disk may define a circular recess diameter, the circular recess diameter of the circular recess of the first surface of the second disk is substantially equivalent to a first tube diameter of the first tube.

In an arrangement, the first surface of the third disk comprises a circular recess wherein the second end of the second tube is positioned within the circular recess of the first surface of the third disk.

In an arrangement, the first disk comprises a first disk diameter that is substantially equivalent to a second disk diameter of the second disk.

In an arrangement, the second disk comprises a second disk diameter that is substantially equivalent to a third disk diameter of the third disk.

In an arrangement, the first tube comprises a first tube diameter that is substantially equivalent to a second tube diameter of the second tube.

In an arrangement, the first disk diameter aperture of the first disk is substantially equivalent to the third disk diameter of the third disk.

In an arrangement, the first disk aperture of the first disk comprises a first disk aperture diameter. The third disk aperture of the third disk may comprises a third disk aperture diameter. The third disk aperture diameter may be substantially equivalent to the first disk aperture diameter.

In an arrangement, the first tube comprises a first material; the first disk comprises a second material; the second disk comprises a third material; the second tube comprises a fourth material; and the third disk comprises a fifth material. In one arrangement, the first material, the second material, the third material, the fourth material, and the fifth all comprise a similar material. For example, the similar material may comprise an acrylic.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and descriptions thereof, will best be understood by reference to the following detailed description of one or more illustrative embodiments of the present disclosure when read in conjunction with the accompanying drawings, wherein:

DETAILED DESCRIPTION

The following detailed description describes various features and functions of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Figure 1:
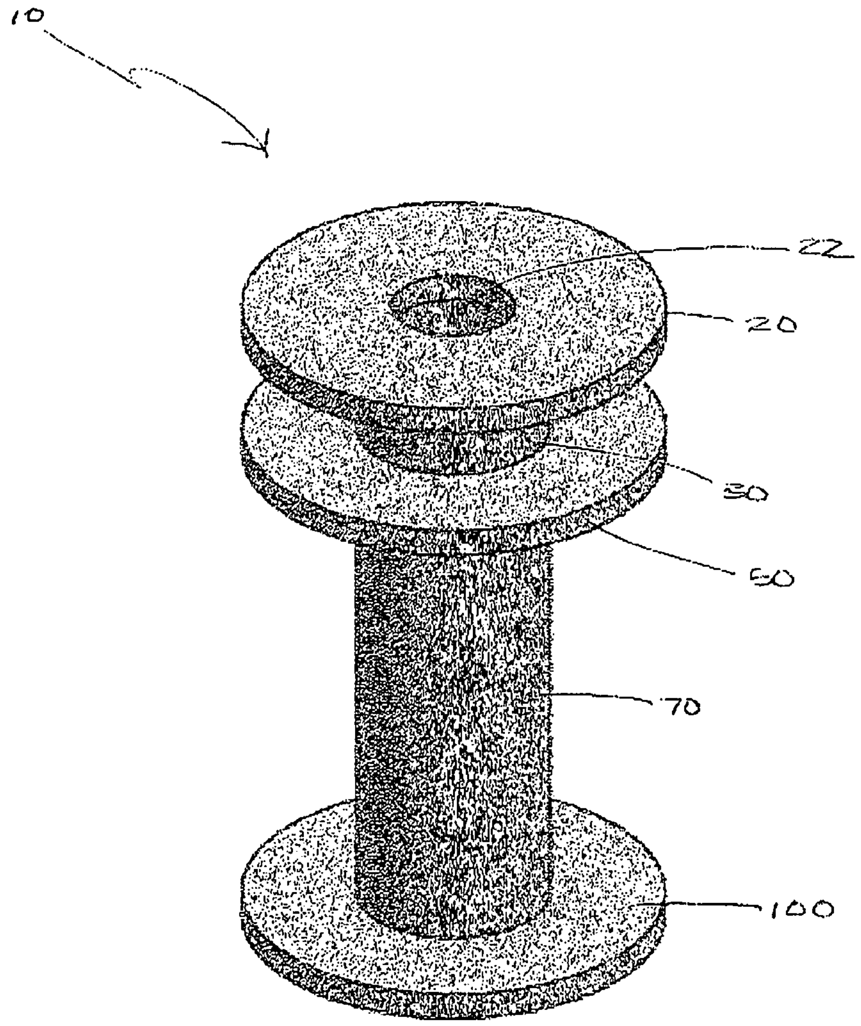
FIG. 1 illustrates a perspective view of a holder in a first orientation, according to an example embodiment.
Figure 2:
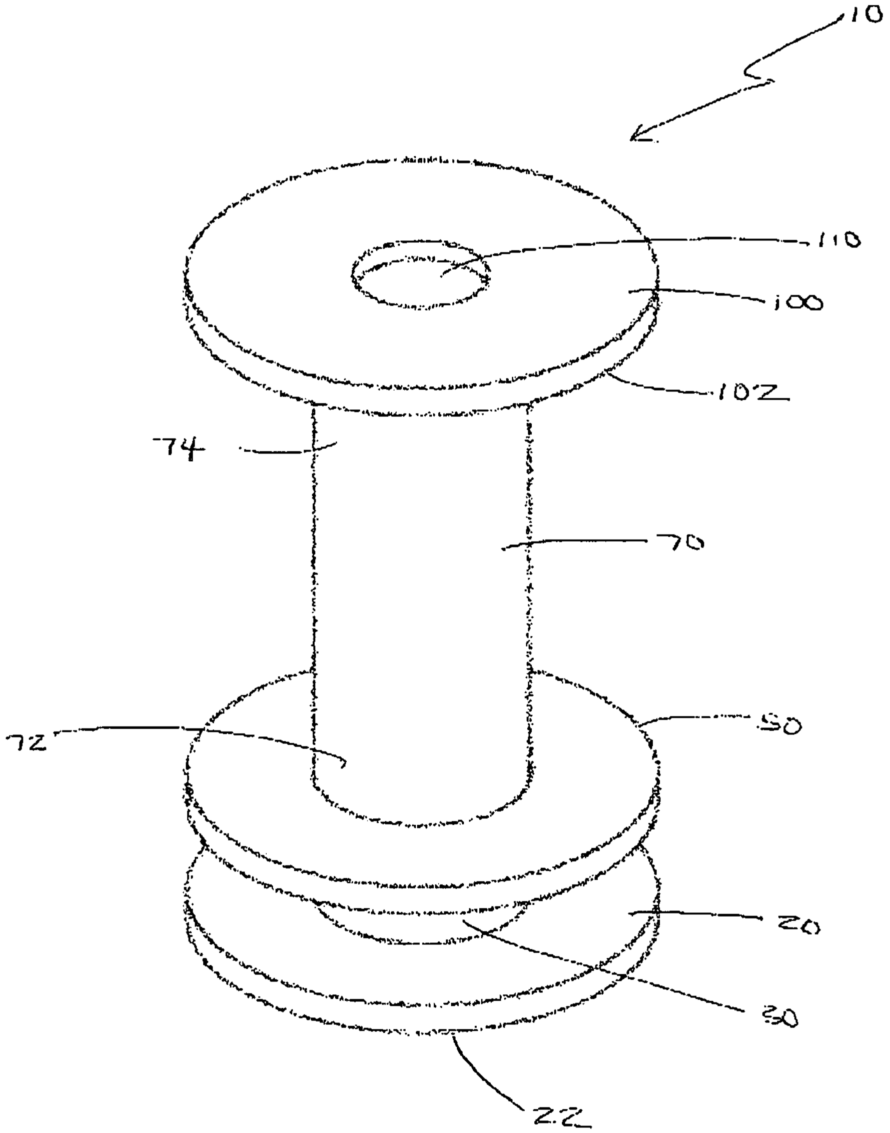
FIG. 2 illustrates a perspective view of a holder in a second orientation, according to an example embodiment.

FIG. 1 illustrates a perspective view of a holder 10, according to an example embodiment. According to an exemplary arrangement, the holder 10 comprises a first disk 20 defining a first disk aperture 22 and a first tube 30. The first disk 20 is positioned over the first tube 30. The holder 10 further includes a second disk 50 that is used to cover an end of the first tube 30. The holder 10 further includes a second tube 70 and a second disk 50 that is positioned over the second tube 70. A third disk 100 is positioned over the second tube 70. The third disk 100 defines an aperture 110 (FIG. 2). As can be seen from FIGS. 1 and 2, a length of the second tube 70 is greater than a length of the first tube 30.

In use, the holder 10 in a first orientation may be used to hold a candle, as illustrated in FIG. 1. For example, in the holder orientation illustrated in FIG. 1, the holder 10 can receive a candle by inserting the candle into the aperture 22 defined by the first disk 20. This inserted candle will then extend into an inner cavity defined by the first tube 30 and then be seated on a first surface of the second disk 50. In this manner, the holder 10 can be utilized as a candle holder.

In addition, in a second orientation, the holder 10 may be inverted or turned up-side as illustrated in FIG. 2. As illustrated in this second orientation, the holder 10 can be used as a vase for holding one or more flowers. In this configuration, one or more flowers may be placed with the aperture 110 defined by the third disk 100. These inserted flowers will then extend into an inner cavity defined by the second tube 70 and then be seated on a second surface of the second disk 50.

Figure 3:
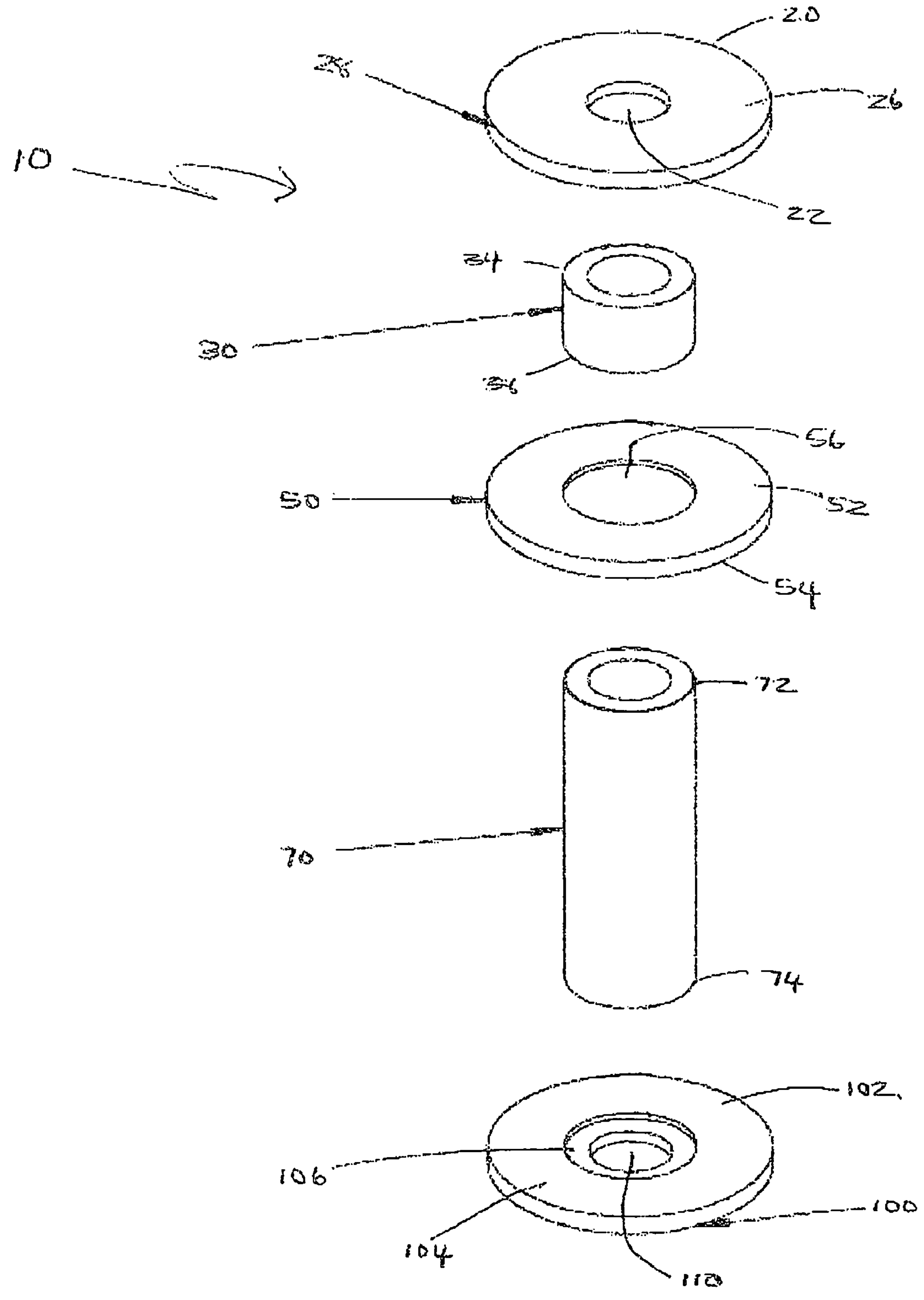
FIG. 3 illustrates a perspective view of the multiple components of a holder, such as the holder illustrated in FIG. 1.
Figure 4:
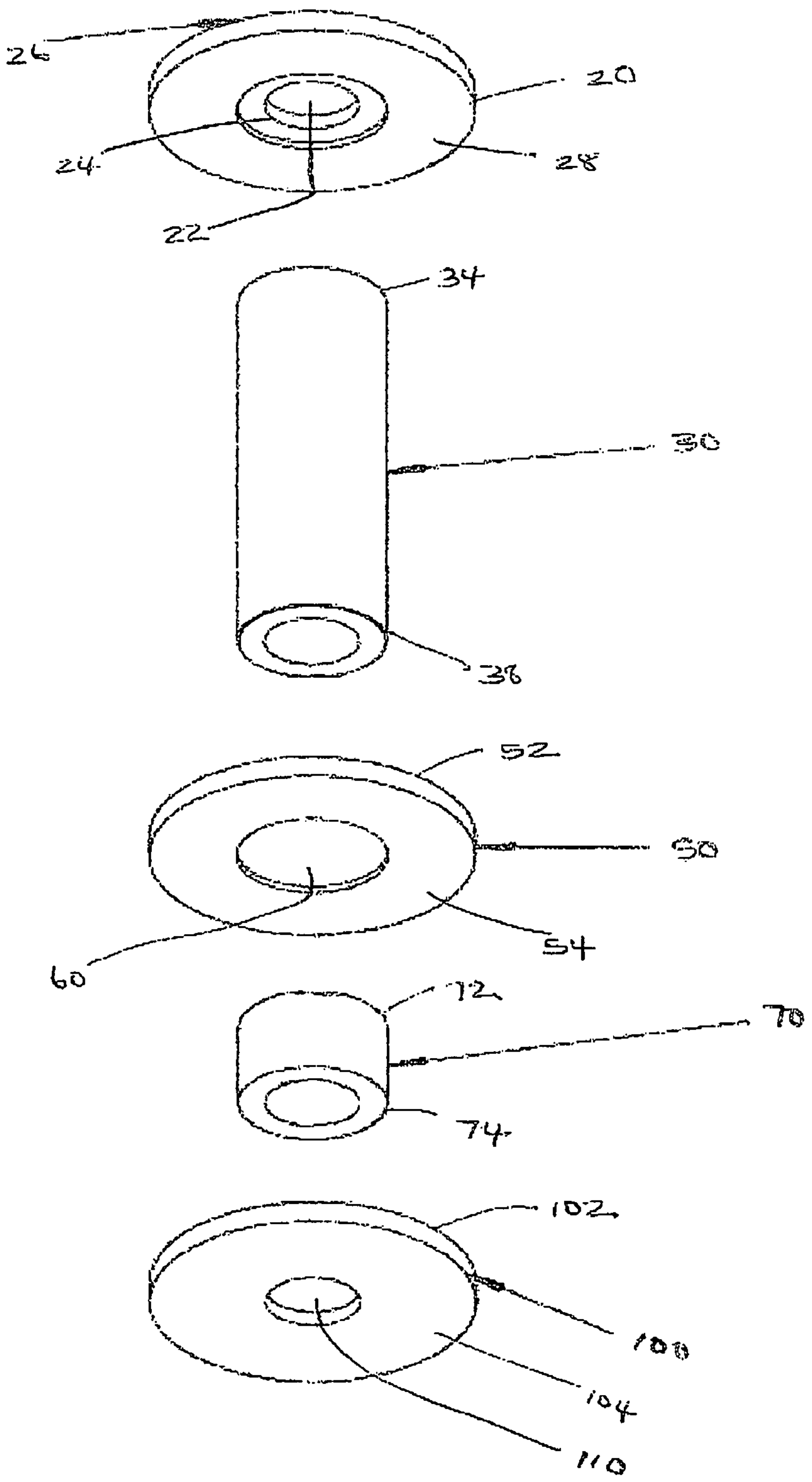
FIG. 4 illustrates another perspective view of the multiple components of a holder, such as the holder illustrated in FIG. 1.

FIG. 3 illustrates a perspective view of the multiple components of a holder, such as the holder 10 illustrated in FIG. 1, and FIG. 4 illustrates another perspective view of the multiple components of a holder, such as the holder 10 illustrated in FIG. 1.

Referring now to FIGS. 3 and 4, the holder 10 comprises a first tube having a first end 34 and a second end 38. The holder also includes a first disk 20 defining a first disk aperture 22. The first disk 20 comprises a first surface 26 and a second surface 28. The second surface 28 is positioned over the first end 34 of the first tube 30. The first disk 20 defines an aperture 22 having a first disk diameter. A second disk 50 comprises a first surface 52 and a second surface 54. The first surface 52 of the second disk 50 covers or seals the second end 38 of the first tube 30.

A second tube 70 is provided comprising a first end 72 and a second end 74. The second surface 54 of the second disk 50 is positioned over the first end 72 of the second tube 70 so as to cover or seal the second tube 70. A third disk 100 is positioned over the second end 74 of the second tube 70. In one arrangement, the third disk 100 defines an aperture 110 having a third disk diameter.

As can be seen from FIG. 4, in an arrangement, the second surface 28 of the first disk 20 comprises a circular recess 24. In one preferred arrangement, the first end 34 of the first tube 30 is positioned within the circular recess 24 defined by the second surface 28 of the first disk 20. The circular recess 24 of the second surface 28 of the first disk 20 defines a circular recess diameter. In one arrangement, the circular recess diameter is substantially equivalent to a first tube diameter of the first tube 30.

In an arrangement, the first surface 52 of the second disk 50 includes a circular recess 56 (FIG. 3). Preferably, the second end 38 of the first tube 30 is positioned within the circular recess 56 defined by the first surface 52 of the second disk 50. The circular recess 56 of the first surface 52 of the second disk 50 may define a circular recess diameter. In one preferred arrangement, the circular recess diameter of the circular recess 56 defined by the first surface 52 of the second disk 50 is substantially equivalent to a first tube diameter of the first tube 30.

In an arrangement, the second surface 54 of the second disk 50 defines a circular recess 60 (FIG. 3). Preferably, the second end 72 of the second tube 70 is positioned within the circular recess 60 defined by the second surface 54 of the second disk 50. The circular recess 60 of the second surface 54 of the second disk 50 may define a circular recess diameter. In one preferred arrangement, the circular recess diameter of the circular recess 60 defined by the second surface 54 of the second disk 50 is substantially equivalent to a second tube diameter of the second tube 70.

In an arrangement, the first surface 102 of the third disk 100 also defines a circular recess. With such a configuration, the second end 74 of the second tube 70 may be positioned within the circular recess 106 defined by the first surface 102 of the third disk 100.

In an arrangement, the first disk 20 comprises a first disk diameter that is substantially equivalent to a second disk diameter of the second disk 50. Similarly, in an arrangement, the second disk 50 comprises a second disk diameter that is substantially equivalent to a third disk diameter of the third disk 100. In an arrangement, the first tube 30 comprises a first tube diameter that is substantially equivalent to a second tube diameter of the second tube 70.

In an arrangement, the first disk aperture 22 of the first disk 20 is substantially equivalent to the third disk diameter of the third disk 100.

In an arrangement, the first disk aperture 22 of the first disk 20 comprises a first disk aperture diameter. The third disk aperture 110 of the third disk 100 may comprise a third disk aperture diameter. The third disk aperture diameter may be substantially equivalent to the first disk aperture diameter.

In an arrangement, the first tube 30 comprises a first material; the first disk 20 comprises a second material; the second disk 50 comprises a third material; the second tube 70 comprises a fourth material; and the third disk 100 comprises a fifth material. In one arrangement, the first material, the second material, the third material, the fourth material, and the fifth are substantially similar to another. For example, the first material comprises an acrylic.

The description of the different advantageous embodiments has been presented for purposes of illustration and description, and is not intended to be exhaustive or limited to the embodiments in the form disclosed. Modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

I claim:

1. A candle holder, comprising:

accommodation for a candle with a cylindrical bottom;

a first cylindrical tube having a bore, a first end and a second end;

a first disk defining a first circular aperture, the first disk comprising a first surface and a second surface, the second surface positioned over the first end of the first tube;

the first circular aperture having a diameter, substantially equal to a diameter of the bore of the first cylindrical tube;

the first disk defining a first circular recess on the second surface of the first disk, wherein the first circular recess has a second diameter;

a second disk comprising a first surface and a second surface, the first surface of the second disk covering the second end of the first cylindrical tube;

wherein, the second disk includes a second circular recess on the first surface and a third circular recess on the second surface, both the second and the third circular recesses having the second diameter;

a second cylindrical tube comprising a bore, a first end and a second end, the second surface of the second disk positioned over the first end of the second tube; and a third disk positioned over the second end of the second tube, the third disk defining a second circular aperture having a diameter, substantially equal to a diameter of the bore of the second cylindrical tube;

wherein, the third disk defines a fourth circular recess on a first surface of the third disk, the fourth circular recess having the second diameter;

wherein, the first end of the first cylindrical tube inserts into the first circular recess of the first disk;

wherein, the second end of the first cylindrical tube inserts into the second circular recess of the second disk;

wherein, the first end of the second cylindrical tube inserts into the third circular recess of the second disk;

wherein, the second end of the second cylindrical tube inserts into the fourth circular recess of the third disk;

wherein, the second cylindrical tube is longer than the first cylindrical tube;

wherein, the first disk, the second disk, and the first cylindrical tube define a first hollow space;

wherein, the cylindrical bottom of the candle is positioned in the first hollow space;

wherein, the second disk, the third disk, and the second cylindrical tube define a second hollow space;

wherein, the second hollow space is operable to hold water and receive a bottom part of a bouquet of flowers, with the holder placed upside-down.

2. The holder of claim 1 wherein the first cylindrical tube comprises a first material;

the first disk comprises a second material;

the second disk comprises a third material;

the second cylindrical tube comprises a fourth material; and the third disk comprises a fifth material.

3. The holder of claim 2 wherein the first material, the second material, the third material, the fourth material, and the fifth material are substantially similar to each other.

4. The holder of claim 3 wherein the first material comprises acrylic.

* * * * *